May 19, 1931. G. M. KENNEDY 1,806,104
AUTOMOBILE RADIATOR SCREEN
Filed May 26, 1930
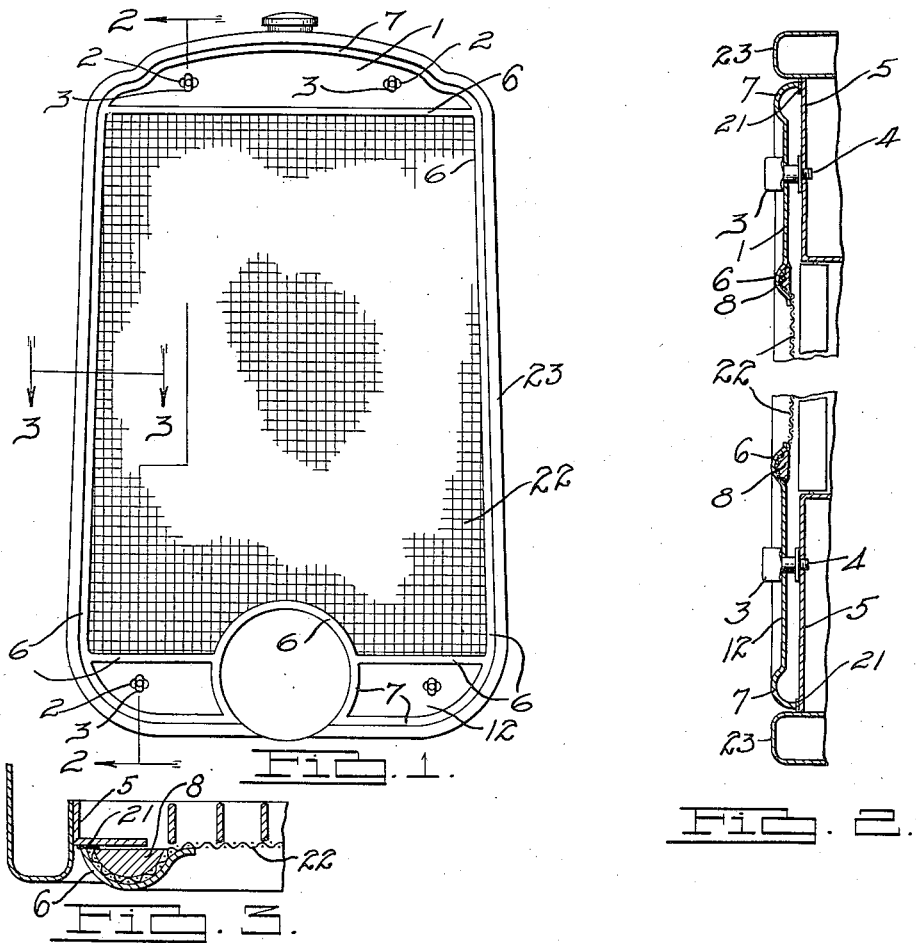
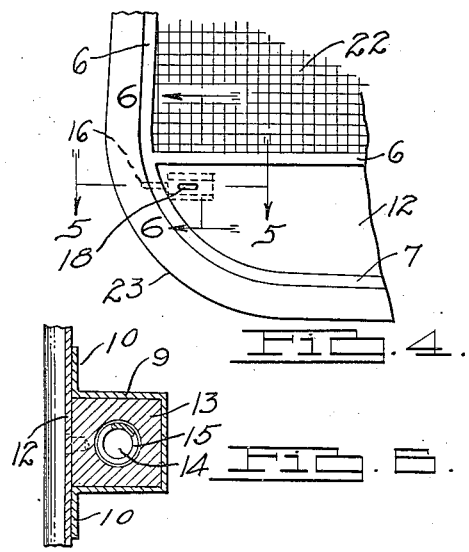
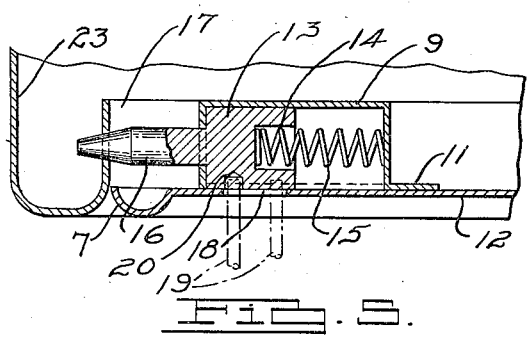
INVENTOR
George M. Kennedy.
BY
ATTORNEY Patented May 19, 1931

1,806,104

UNITED STATES PATENT OFFICE

GEORGE M. KENNEDY, OF DETROIT, MICHIGAN

AUTOMOBILE RADIATOR SCREEN

Application filed May 26, 1930. Serial No. 455,533.

This invention relates to automobile radiator screens and the object of the invention is to provide a screen adapted for attachment to an automobile radiator to prevent insects from being drawn into the radiator and interfering with flow of air through the radiator.

One of the particular objects of the invention is to provide a means for securing wire screen cloth to a frame in a manner to maintain the screen taut and prevent it from sagging or bulging between the edges of the frame.

Another object of the invention is to provide an automobile radiator screen which may be detachably secured to the automobile radiator and which may be readily removed or replaced at any time.

A further object of the invention is to provide an automobile radiator screen which enhances the appearance of the radiator and at the same time serves a useful purpose in preventing foreign matter from entering the core of the radiator and clogging the air ducts through which the air is normally drawn by the cooling fan.

These objects and the several novel features of the invention are hereinafter more fully described and claimed and the preferred form of construction by which these objects are attained is shown in the accompanying drawings in which—

Fig. 1 is an elevation of an automobile radiator screen embodying my invention as mounted in relation to a radiator shell.

Fig. 2 is an enlarged section taken on line 2—2 of Fig. 1.

Fig. 3 is an enlarged section taken on line 3—3 of Fig. 1.

Fig. 4 is a detail of an alternative fastening means.

Fig. 5 is an enlarged section taken on line 5—5 of Fig. 4.

Fig. 6 is an enlarged section taken on line 6—6 of Fig. 4.

As shown in Fig. 1, a sheet metal frame is provided for the screen having a flat top portion 1 provided with apertures 2 through which the fasteners 3 extend to secure the screen to the radiator. These fasteners as shown in Fig. 2 are provided with threaded ends 4 which are threaded through apertures provided therefor in the shutter front 5 which is mounted in the radiator shell and the outer ends 3 of the fasteners are inserted through the apertures 2 and are turned at a right angle as shown to secure the screen frame to the shutter front. The screen frame is preferably formed to conform to the lines of the radiator shell 23 and the frame is pressed to provide a channel 6 about the central opening in the screen frame. Similar channels 7 are also provided at the top and bottom of the screen frame for decorative and strengthening effect. In manufacturing the screen, the wire screen cloth 22 is laid on the back of the screen frame and the wire cloth at the edges is pressed into the channels 6 thus stretching the screen taut on the frame and while so held the channels 6 are filled with solder at 8 as shown in Figs. 2 and 3. This firmly secures the screen to the frame and prevents it from coming loose and at the same time holds the screen under tension to prevent it from sagging or bulging. The solder in the channels 6 also provides stiffening ribs for the frame while holding the screen in place.

The fasteners 3 are secured to the top and bottom of the shutter front and the screen frame is provided with apertures to fit over these fasteners so that the screen frame may be readily attached to or detached from the shutter front and the screen and frame are preferably chromium plated to enhance the appearance of the screen in combination with the radiator and to lengthen the life of the screen. The chromium plating provides a hard finish on the wire cloth and at the same time does not appreciably diminish the size of the mesh. With the chromium plated screen in place the shutters of the shutter front are not readily visible and the screen also practically conceals the radiator core from view. At the same time, the screen prevents practically all types of insects from being drawn into the radiator core and reducing the radiation, as the only insects which can pass through the screen would be too small to clog the radiator core. This form of the screen shown in Figs. 1, 2 and 3 extends over the edges of the shutter front and is held in contact therewith to prevent insects from passing into the radiator between the screen frame and radiator shell. It is also to be noted that a felt strip 21 is cemented to the edge of the screen frame as shown in Fig. 2 to prevent the screen frame from rattling on the part to which it is secured.

In some instances, it is desirable to connect the radiator screen direct to the radiator shell. In this case, the screen must be fastened in the central opening of the radiator shell so as to extend practically flush with the said shell.

For this purpose, a rectangular housing 9 is provided with flanges 10 and 11 shown in Figs. 5 and 6 which are spot-welded to the lower screen frame portion 12 and to the upper screen frame portion 1. A member 13 is slidably mounted in each rectangular housing 9 and is recessed at 14 to receive the coiled spring 15 which engages against the rear end of the housing. This coiled spring 15 throws the bolt 16 outwardly and the end of the bolt preferably extends through an aperture provided therefor in the inturned flange 17 at the inner edge of the radiator shell 5. The ends of the bolts 16 are preferably pointed or tapered as shown in Fig. 5 so as to bindingly engage in the apertures therefor in the flange 17 of the radiator shell and prevent the screen frame from rattling on the radiator shell. These bolts are provided at the four corners of the screen frame and the screen frame at each corner is provided with a slot 18 through which a nail or pencil point 19 may be inserted into the recess 20 in the member 13 to allow the member 13 to be retracted against the tension of the spring 15 and withdraw the bolt 16 from the inturned flange 17 of the radiator shell. This form is also chromium plated and may be readily secured in position or removed when desired. While I have shown the spring pressed bolts 16 on both sides of the screen frame, stationary pins may be used on one side while spring pressed bolts 16 may be used on the other side.

From the foregoing description it becomes evident that the device is very simple and efficient in operation, will not easily get out of order, may be readily secured to or removed from the radiator shell and provides a device which accomplishes the object described.

Having thus fully described my invention, its utility and mode of operation, what I claim and desire to secure by Letters Patent of the United States is—

1. In an automobile radiator screen, the combination with a radiator shell having an inturned flange about the central opening therein, of a sheet metal frame shaped to fit within the said opening, the said frame being formed to provide a central opening and a continuous channel thereabout, a screen extending across the frame and pressed into the said channel at the edges, the channel being filled with solder to secure the screen to the frame, a series of spring pressed bolts mounted on the frame and each having a tapered end, the inturned flange of the radiator shell being apertured to receive the tapered ends of the said bolts and means whereby the bolts may be retracted from the said apertures from the exterior of the screen frame.

2. In an automobile radiator screen, the combination with a radiator shell having an inturned flange about the central opening therein, of a sheet metal frame shaped to fit within the said opening, a screen extending across the frame and secured thereto, the inturned flange of the radiator shell being provided with a series of apertures and a series of spring pressed bolts carried by the screen frame and each provided with a conical end adapted to bindingly engage in the apertures of the inturned flange of the radiator shell.

3. In an automobile radiator screen, the combination with a radiator shell having an inturned flange about the central opening therein, of a sheet metal frame shaped to fit within the said opening, a screen extending across the frame and secured thereto, a series of spring pressed bolts carried by the screen frame and the inturned flange of the radiator shell being apertured to receive the said bolts.

4. In an automobile radiator screen, a frame having a central opening and formed to provide a channel about the opening, a screen covering the opening and pressed into the channel about the opening, the channel being filled with solder to secure the screen to the frame and means for detachably securing the frame to an automobile radiator shell to cover the opening in the radiator shell.

5. In an automobile radiator screen, a sheet metal frame having a central opening and formed to provide a channel about the opening, a screen covering the opening and pressed into the channel about the opening, the channel being filled with solder to secure the screen to the frame and means for detachably securing the frame to an automobile radiator shell.

6. In an automobile radiator screen, a sheet metal frame adapted to be detachably secured to an automobile radiator shell, the frame being provided with a central opening, a channel formed in the frame about the central opening, a screen extending across the opening and pressed into the channel at the edges, the channel being filled with solder to secure the screen to the frame and to stiffen the frame.

7. In an automobile radiator screen, a sheet metal frame having a central opening therein and formed to provide a channel about the opening, a screen covering the opening and pressed into the channel about the opening to place a tension on the screen, the channel being filled with solder to secure the screen to the frame and to maintain the screen taut on the frame.

In testimony whereof I sign this specification.

GEORGE M. KENNEDY.